(12) United States Patent
Callingham (10) Patent No.: US 6,463,880 B1
(45) Date of Patent: Oct. 15, 2002

(54) DRINKING BOWL FOR A PET ANIMAL

(76) Inventor: John Charles Callingham, Suite 6, 296-298 Great North Road, Abbotsford, New South Wales 2046 (AU)

( * ) Notice: Subject to any disclaimer, the term of this patent is extended or adjusted under 35 U.S.C. 154(b) by 0 days.

(21) Appl. No.: 09/857,354
(22) PCT Filed: Dec. 3, 1999
(86) PCT No.: PCT/AU99/01078
§ 371 (c)(1),
(2), (4) Date: Aug. 24, 2001
(87) PCT Pub. No.: WO00/33647
PCT Pub. Date: Jun. 15, 2000

(30) Foreign Application Priority Data

Dec. 4, 1998 (AU) .............................. PP7527

(51) Int. Cl.⁷ ................................................ A01K 7/00
(52) U.S. Cl. ............................. 119/78; 119/73; 119/74; 119/77
(58) Field of Search ............................. 119/78, 73, 74, 119/77; 47/79, 71

(56) References Cited

U.S. PATENT DOCUMENTS

| | | | |
|---|---|---|---|
| 1,086,785 A | * 2/1914 | Parkins ......................... | 119/78 |
| 3,809,291 A | * 5/1974 | Purdy ............................ | 119/78 |
| 4,100,885 A | 7/1978 | Kapplinger ................... | 119/73 |
| 4,130,090 A | 12/1978 | Bohlmann .................... | 119/73 |
| 4,204,367 A | * 5/1980 | Cone .............................. | 47/71 |
| 4,329,940 A | * 5/1982 | Humphries ................... | 119/78 |
| 4,351,164 A | 9/1982 | Christiani ..................... | 62/315 |
| 4,380,157 A | 4/1983 | Christiani ..................... | 62/315 |
| 4,470,371 A | * 9/1984 | Strickland ..................... | 119/78 |
| 4,691,664 A | 9/1987 | Crowell ......................... | 119/61 |
| 5,247,762 A | 9/1993 | Green ............................ | 47/79 |
| RE34,427 E | * 11/1993 | Schafer ......................... | 119/78 |
| 5,566,639 A | * 10/1996 | McKinstry et al. ........... | 119/78 |
| 5,782,202 A | * 7/1998 | Strickland ..................... | 119/78 |
| 6,119,628 A | * 9/2000 | Lorenzana et al. ........... | 119/78 |
| 6,145,473 A | * 11/2000 | Keisner ......................... | 119/78 |

FOREIGN PATENT DOCUMENTS

AU          A-11240/92      2/1992    .......... A01K/39/00

* cited by examiner

Primary Examiner—Charles T. Jordan
Assistant Examiner—Joan M. Olszewski
(74) Attorney, Agent, or Firm—Webb Ziesenheim Logsdon Orkin & Hanson, P.C.

(57) ABSTRACT

A bowl (1) for containing drinking water for a pet animal, the bowl (1) including a first surface at least partially defining a depression (2) for holding the drinking water and a second surface (3) exposed to air, the first and second surfaces (2, 3) being separated by a water permeable material so that water may pass through the first surface (2) to the second surface (3), and wherein evaporation of water from the second surface (3) acts to cool the drinking water contained within the depression (2).

9 Claims, 9 Drawing Sheets

DRINKING BOWL FOR A PET ANIMAL

FIELD OF THE INVENTION

This invention relates to drinking bowls for pet animals.

BACKGROUND OF THE INVENTION

The present invention has been developed primarily as a drinking bowl for a pet animal, such as a domestic cat or dog, and will be described hereinafter with reference to this application.

Owners of pet animals have, in the past, provided troughs or bowls to contain drinking water for their animal. Such troughs or bowls suffer from the disadvantage that once emptied, whether as a result of the animal having consumed all the water or as a result of evaporation, spillage, or any other means, the owner must take action to refill the bowl or otherwise the animal will go thirsty. Many pet owners however do not remain at home all day with their animal and as such cannot regularly monitor the water available for their pet. Thus a risk exists that the animal may be deprived of water for an extended period of time. This can have dire consequences, particularly in the hot summer months.

Moreover, existing troughs and bowls suffer from the disadvantage that they contain a static body of water which, particularly in the summer months, can be heated by the sun to such a degree that the water is too hot for the animal to comfortably drink.

It is an object of the present invention to overcome or ameliorate at least one of the disadvantages of the prior art, or to provide a useful alternative.

DISCLOSURE OF THE INVENTION

According to a first aspect of the invention there is provided a pet animal drinking bowl, said bowl including a first surface at least partially defining a depression for holding drinking water and a second surface exposed to air, said first and second surfaces being separated by a water permeable material so that water may pass through said first surface to said second surface, wherein evaporation of water from said second surface acts to cool the drinking water contained within said depression, said bowl further including a chamber for receiving water from a source, wherein there is provided fluid communication between said chamber and said depression so as to permit a flow of water from said chamber to said depression so as to maintain a predetermined level of water within said depression.

Preferably the second surface includes a number of spaced apart support columns which define a plurality of air flow channels.

Preferably the water permeable material is an unsintered ceramic material such as, for example, stoneware or earthenware. Alternatively, the water permeable material may be a synthetic material.

Preferably the bowl is adapted to be connected to a supply of water.

Preferably the bowl includes a valve to regulate the supply of water to the depression.

Preferably the bowl includes a chamber adapted for fluid communication with the depression, a float located in said chamber and operatively connected to said valve in order to maintain a predetermined level of water within said depression.

Preferably the bowl includes a cover for the chamber, the cover including a receptacle that extends into the chamber such that a soluble additive contained therein is immersed in the predetermined level of water.

According to a further aspect of the invention there is provided a bowl assembly for containing drinking water for a pet animal, said assembly including:

a bowl for containing drinking water for a pet animal, said bowl including a first surface at least partially defining a depression for holding said drinking water and a second surface exposed to air, said first and second surfaces being separated by a water permeable material so that water may pass through said first surface to said second surface, wherein evaporation of water from said second surface acts to cool the drinking water contained within said depression; and a bowl support plate of water permeable material.

BRIEF DESCRIPTION OF THE DRAWINGS

Preferred embodiments of the present invention will now be described, by way of example only, with reference to the accompanying drawings in which.

DETAILED DESCRIPTION OF PREFERRED EMBODIMENT(S)

Figure 1:
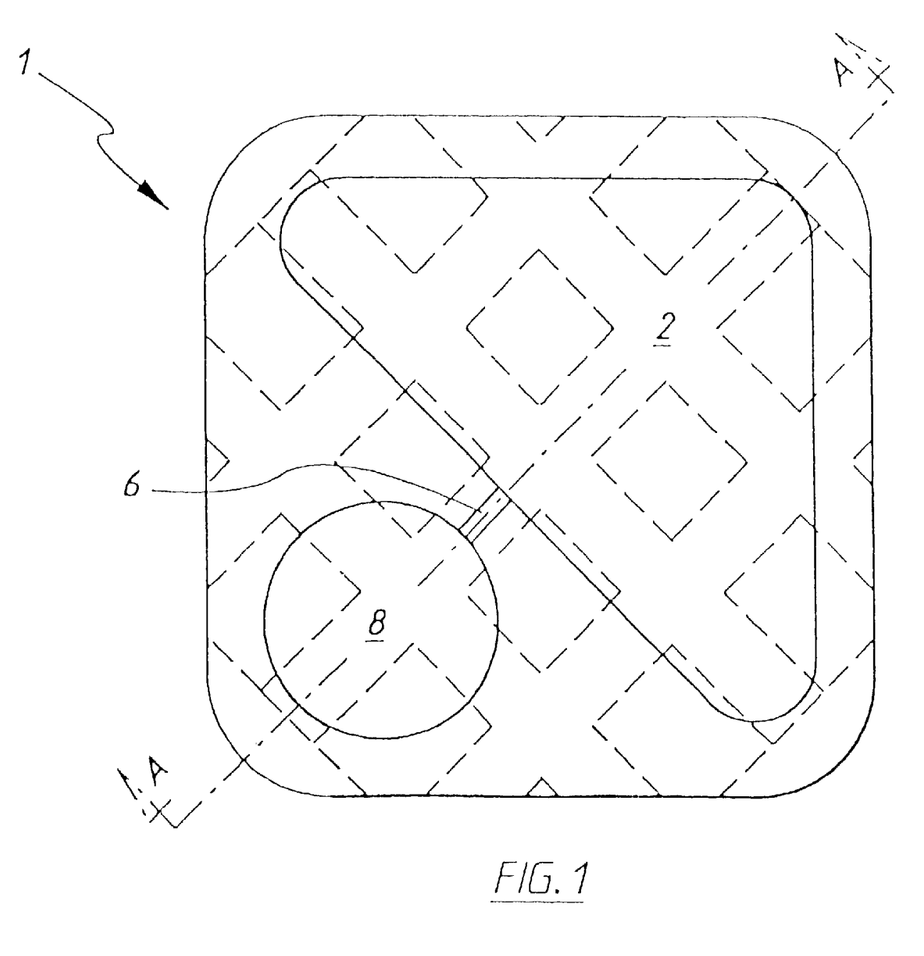
FIG. 1 depicts a plan view of a first preferred embodiment of the invention.
Figure 2:
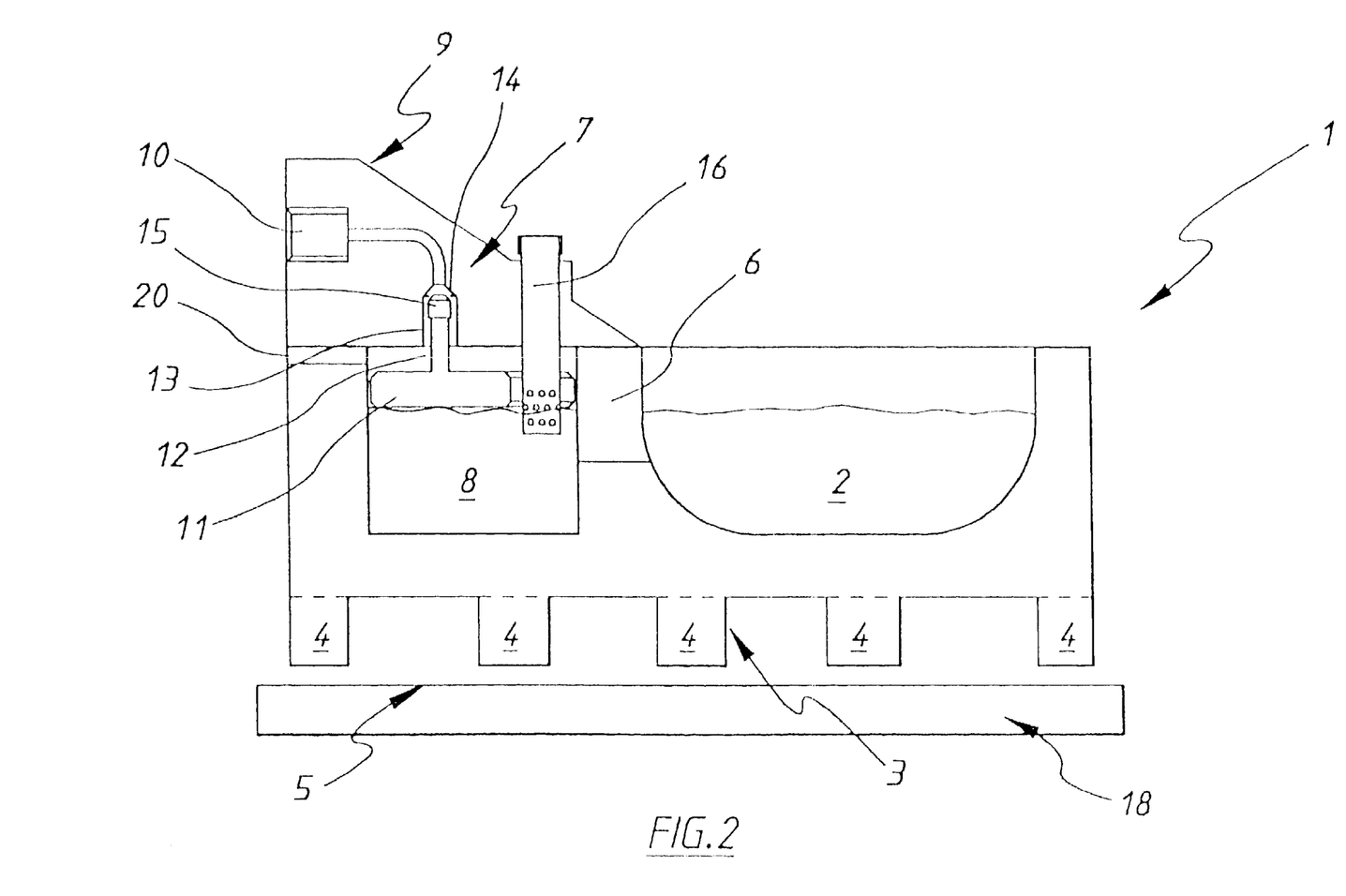
FIG. 2 depicts a sectional elevation view along line A—A of FIG. 1.
Figure 3:
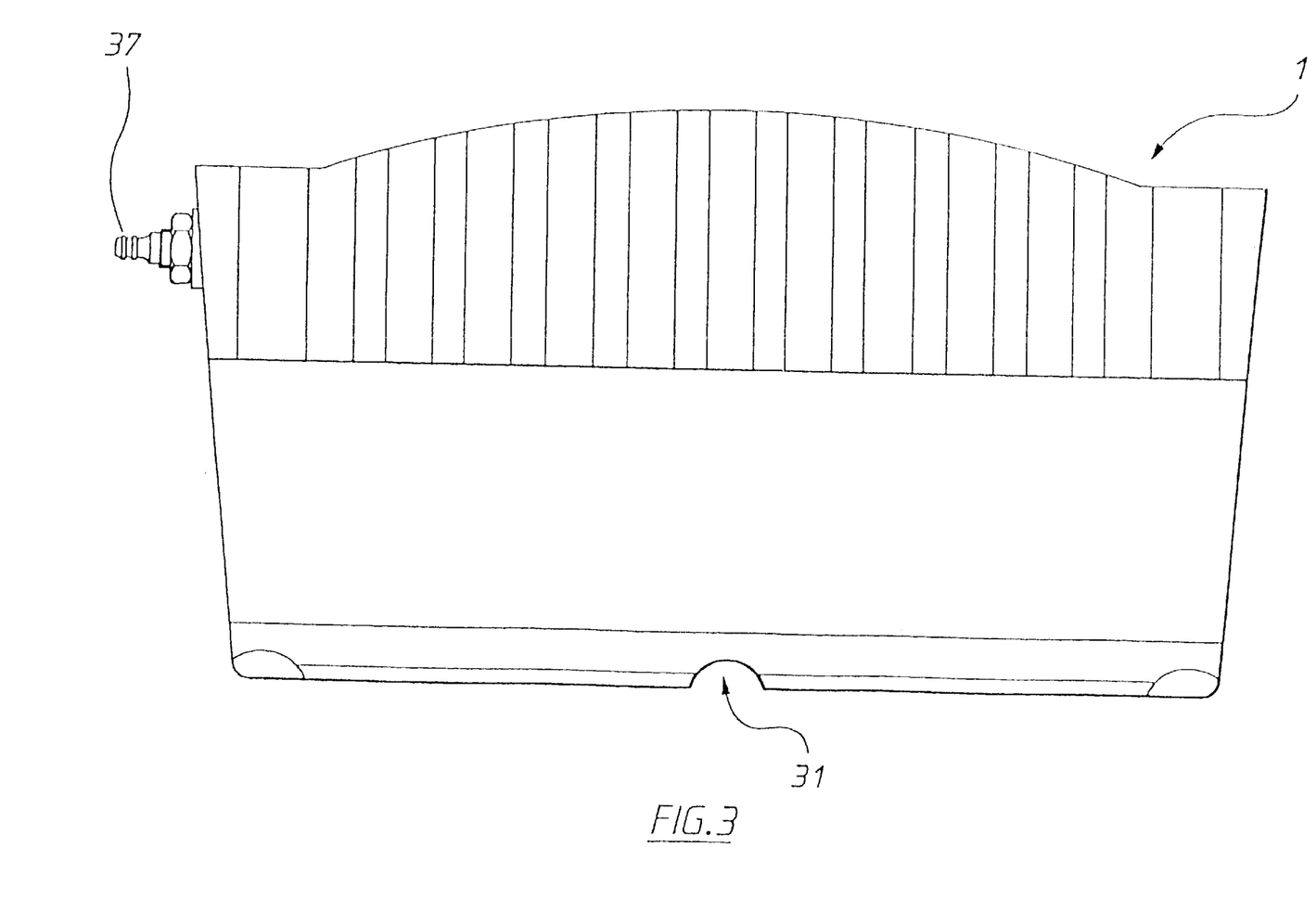
FIG. 3 depicts a front elevation view of a second preferred embodiment of the invention.
Figure 4:
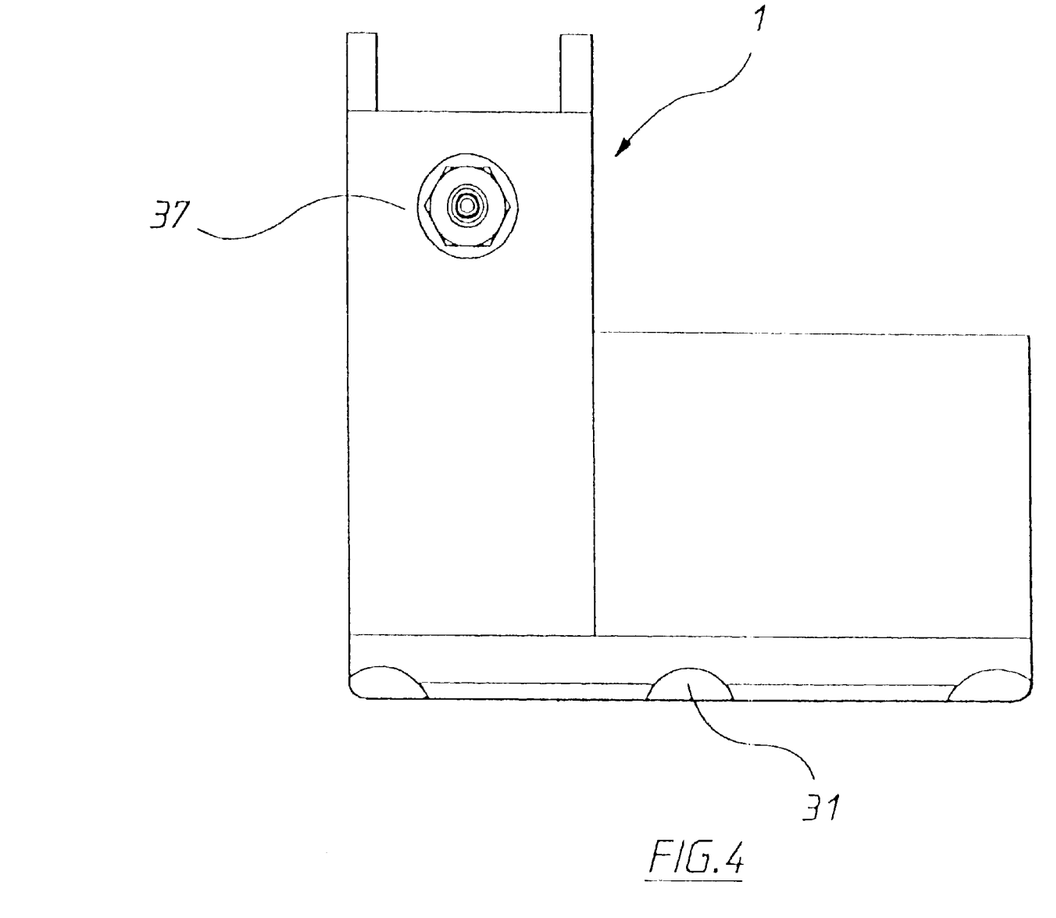
FIG. 4 depicts a side elevation view of the embodiment shown in FIG. 3.

Referring to FIGS. 1 and 2, a first preferred embodiment of the invention is illustrated. The bowl 1 includes a first, upper surface which includes a depression 2 for retaining drinking water for a pet animal, such as a domestic dog or cat. The bowl further includes a second, lower surface 3 which is exposed to the surrounding air. The lower surface 3 includes a number of spaced apart support columns 4 to raise the body of the bowl 1 above a supporting surface 5. At least part of the surface of the depression 2 is formed from a water permeable material, such as unsintered earthenware or stoneware. It will be appreciated however that suitable synthetic water permeable materials may also be used. Furthermore, at least a portion of the body of the bowl 1 intermediate the permeable surface of the depression 2 and the lower surface 3 is also made from a water permeable material so that water contained within the depression 2 can permeate through the material to the lower surface 3. Upon reaching the lower surface the water is evaporated into the surrounding air. The latent heat required for this evaporation is extracted from the bowl, and as a result the temperature of the bowl and the water contained in the depression 2 are reduced. It will be appreciated that as the ambient temperature increases the rate of evaporation and resultant cooling will also increase. The result of such cooling is that the water contained in the depression will be at a temperature which is lower than it would otherwise be if contained in a conventional drinking bowl.

Preferably the material from which the body of the bowl is made is unsintered earthenware or stoneware. Preferably the bowl is "bisque" fired in a kiln at a temperature in the range of approximately 970° C. to 990° C.

In order to counteract the loss of water from the depression via permeation, evaporation and the pet's drinking requirements, the bowl is connected to a source of water. In one preferred form of the invention the water source is provided by a main water supply. The rate at which water is supplied to the bowl 1 is controlled by a suitable valve arrangement 7 so as to maintain a predetermined water level within the depression. The valve arrangement is housed within a float chamber 8 which is in fluid communication with the depression 2 via an aperture 6 so that water contained in the float chamber may flow into the depression.

To prevent foreign matter such as leaves or the like interfering with the valve arrangement 7 the float chamber 8 is provided with a cover member 9. The cover 9 may be adapted to include a fitting 10 to which a hose or pipe (not shown) can be connected in order to supply water to the bowl.

In the embodiment depicted in FIGS. 1 and 2, the valve assembly includes a float 11 adapted for vertical floating movement within the chamber 8. The float has an upwardly extending stem 12 for slidable movement within a corresponding guide channel 13 provided in the cover 9. The upstream end of the guide channel 13 is in fluid communication with the fitting 10, and includes a valve seat 14. A cap 15 of resilient material, such as rubber, is provided on the end of the stem 12, for sealing against valve seat 14, thereby interrupting the supply of water to the chamber 9. The bowl may also include an overflow port 20 leading from the float chamber in the event that the valve mechanism becomes stuck in an open position for any reason.

The cover member 9 may also be provided with a receptacle 16 that extends into the chamber 8 so that a water soluble additive (not shown) may be placed in the receptacle and immersed in the water in the chamber. The water soluble additive may be, for example, a dietary supplement or medicament required by the pet animal. Additionally, the cover may also provide a suitable surface for the display of a decorative logo or trademark, or instructions for use.

To optimise the evaporation of water via the lower surface 3 a plurality of support elements 4 are provided in the form of vertical columns. In the embodiment depicted in FIGS. 1 and 2, the columns are arranged in a "checkerboard" formation. This exposes a large surface area to the atmosphere and provides a plurality of air flow channels to facilitate evaporation from the lower surface.

To provide a stable foundation for the bowl 1 on uneven surfaces a bowl support plate 18 may be provided to act as a base for the bowl. Such a plate can be set into a suitable bedding material such as concrete, cement or sand or the like to provide a stable and level surface for the bowl. Preferably the support plate is also formed from a water permeable material so as to assist in drawing water through the bowl and increasing evaporation, thus increasing the cooling effect.

FIGS. 3 to 8 depict a second preferred embodiment of the present invention. For the sake of clarity, those features which are common with the first preferred embodiment illustrated in FIGS. 1 and 2 have been given the same reference numerals. The embodiment depicted in FIGS. 3 to 8 varies from the embodiment of FIGS. 1 and 2 primarily with respect to the configuration of the air flow channels on the underside of the bowl and in the means by which the water level in the bowl is regulated.

Figure 5:
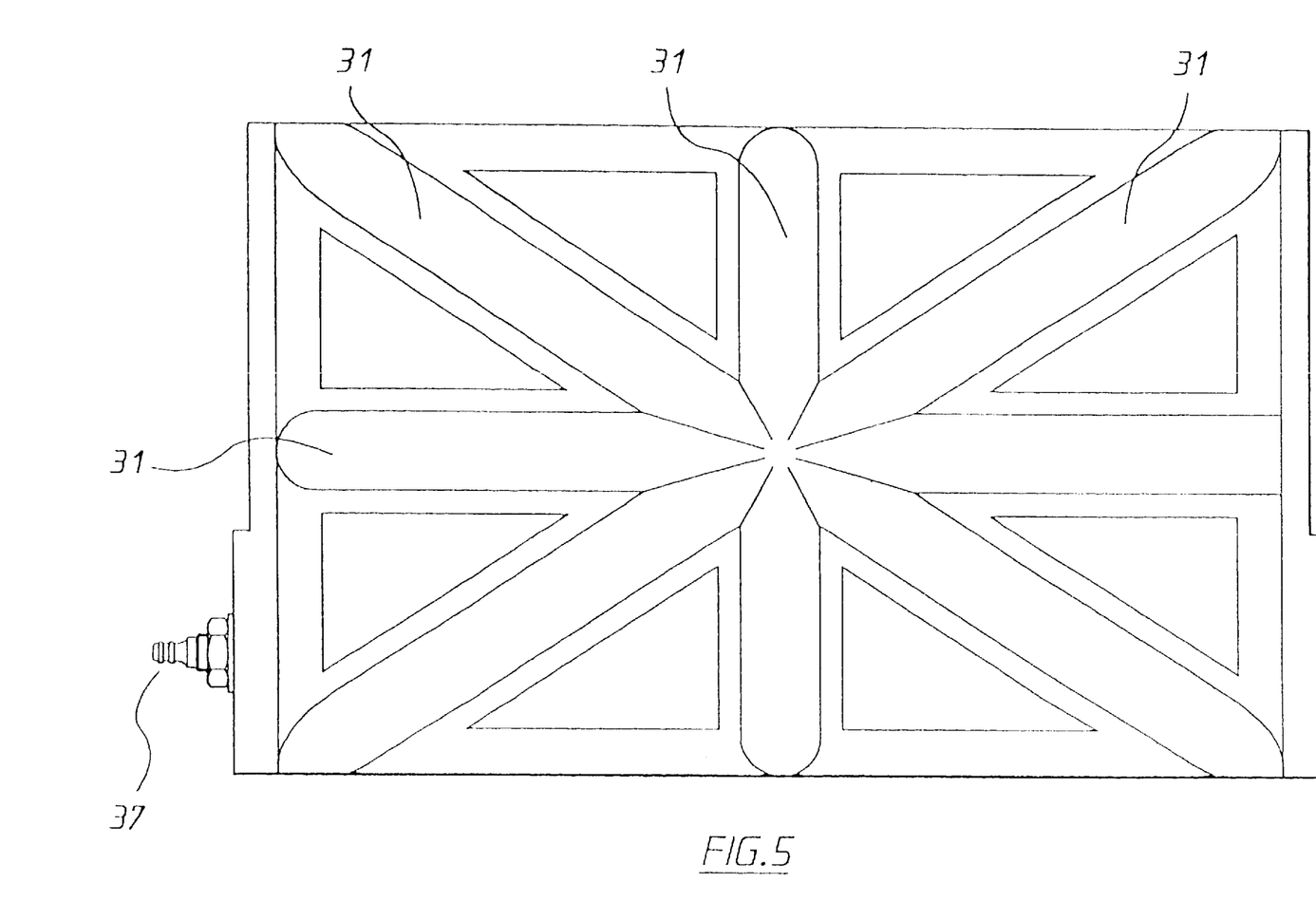
FIG. 5 depicts an underside view of the embodiment shown in FIG. 3.

FIG. 5 depicts an underside view of the bowl according to the second preferred embodiment of the invention. The underside surface of the bowl is provided with a plurality of air flow channels 31 to facilitate air flow underneath the bowl and enhance evaporation from the lower surface of the bowl. As illustrated, the underside surface of the bowl is provided with a combination of transversely, longitudinally and diagonally extending air flow channels. This configuration of air flow channels has been found to allow for the passage of air streams from a variety of directions.

Figure 6:
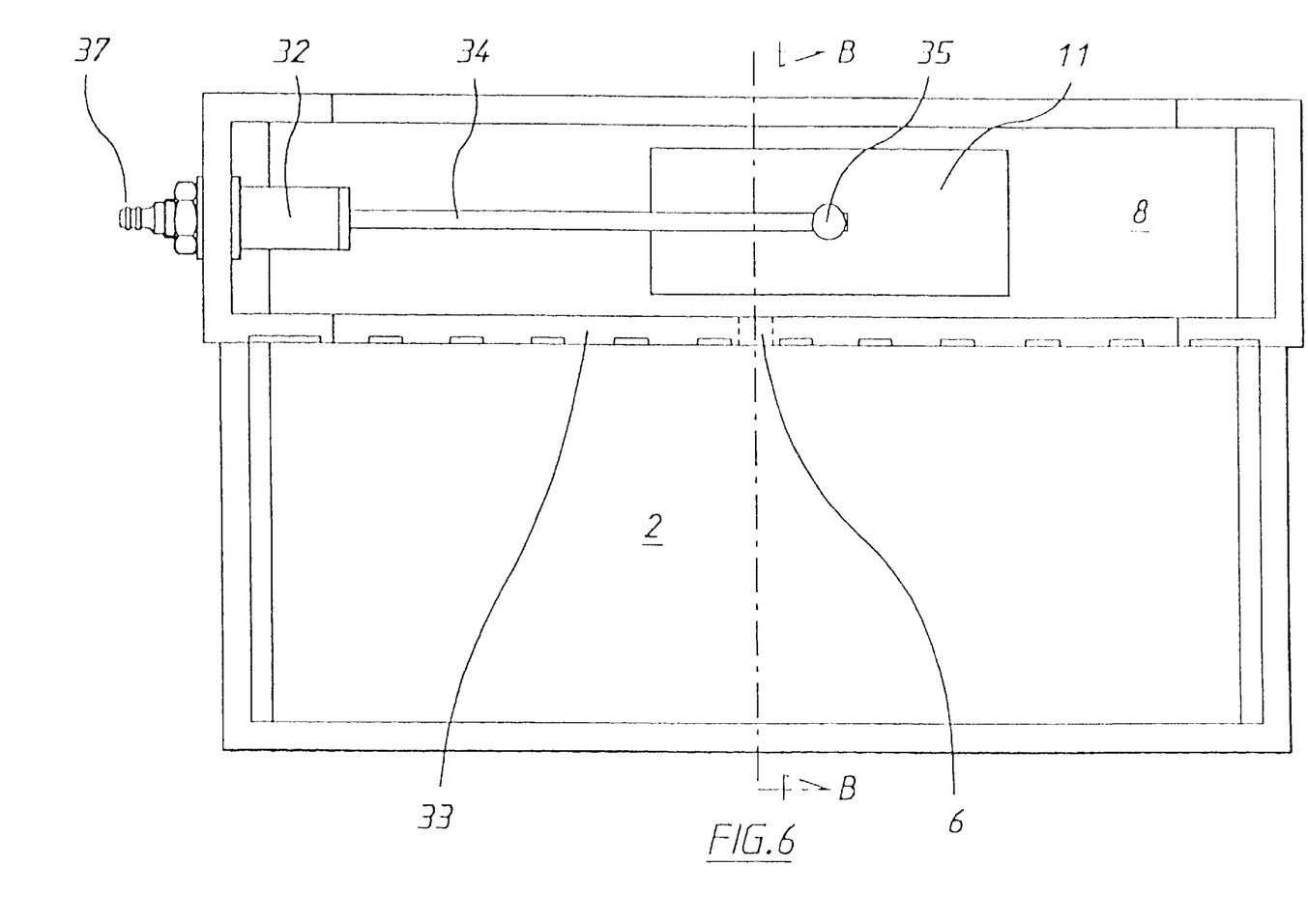
FIG. 6 depicts a plan view of the embodiment shown in FIG. 3.
Figure 7:
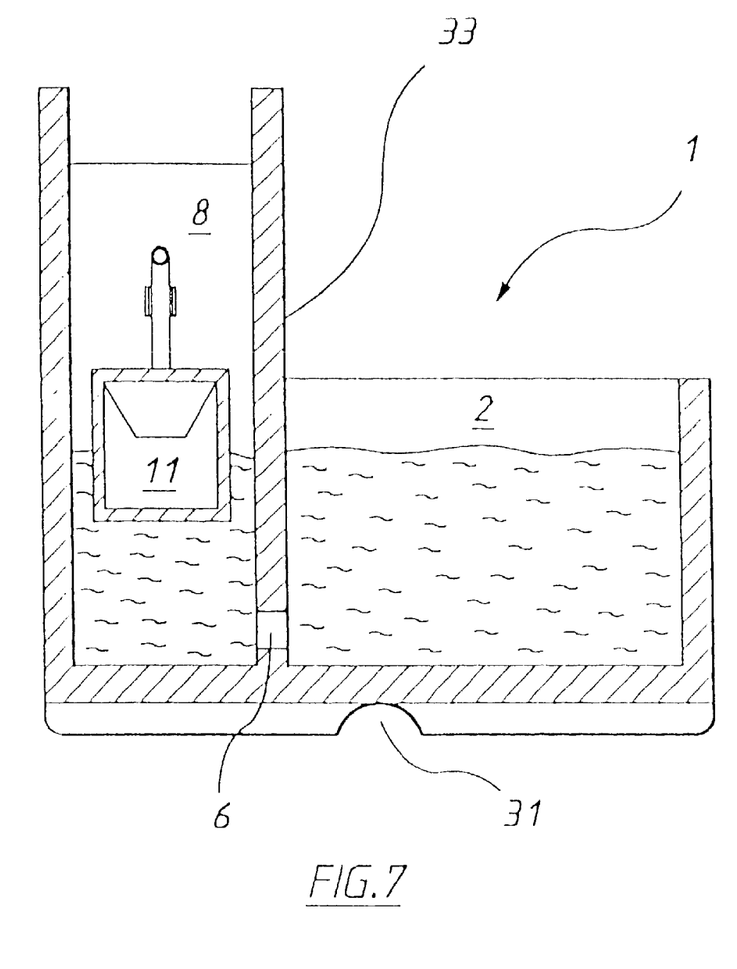
FIG. 7 depicts a sectional elevation view along line B—B of FIG. 6.
Figure 8:
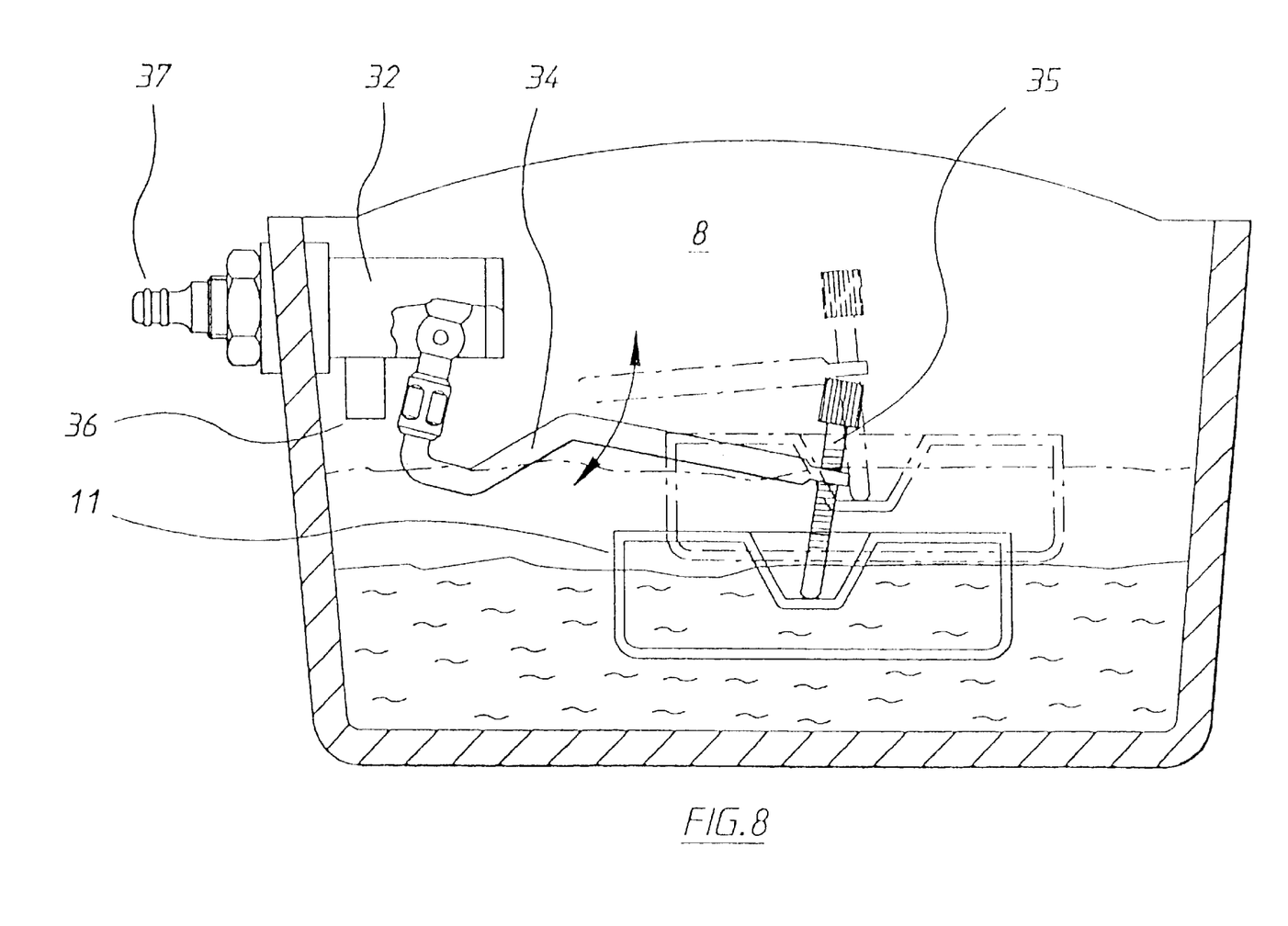
FIG. 8 depicts a sectional elevation view of the float chamber of the second preferred embodiment.

As is best illustrated in FIGS. 6 to 8, the bowl includes a float chamber 8 within which a float 11 is located. The float is operatively connected to a valve means 32. A supply of water is connected to the bowl by means of a connection 37 provided in a side wall of the float chamber 8 and the valve 32 acts to control the flow of water from the water supply into the chamber. Fluid communication between the float chamber 8 and the main bowl 2 is provided by means of a port 6 extending through the wall 33 separating the chamber and the main bowl.

Referring to FIG. 8, the operation of the float and valve mechanism is further illustrated. The float 11 is located in a chamber 8 and rises and falls with the level of the water in the chamber as illustrated. The float 11 is connected to one end of an arm 34, the arm 34 being provided with a finger 35 which seats on the float so as to provide connection between the float and the arm. The finger 35 takes the form of a threaded member which is threadedly engaged in the end of the arm so as to allow a range of axial adjustment of the finger relative to the arm. This permits the float and valve mechanism to be adjusted according to the water pressure being supplied. The opposing end 36 of the arm is rotatably mounted to the valve assembly 32, with rotation of the arm 34 controlling the opening and closing of the valve. As the level of water in the chamber 8 falls the float 11 moves downwardly which in turn causes the arm 34 to rotate. The rotation of the arm causes the valve 32 to be opened, thereby permitting a flow of water into the chamber via outlet 36 and thus increasing the water level. As there is fluid communication between the chamber 8 and the main bowl 2 via port 6, the water level in the main bowl is correspondingly increased. In this way, the water level in the main bowl can be maintained without the need for regular supervision by the pet's owner.

Figure 9:
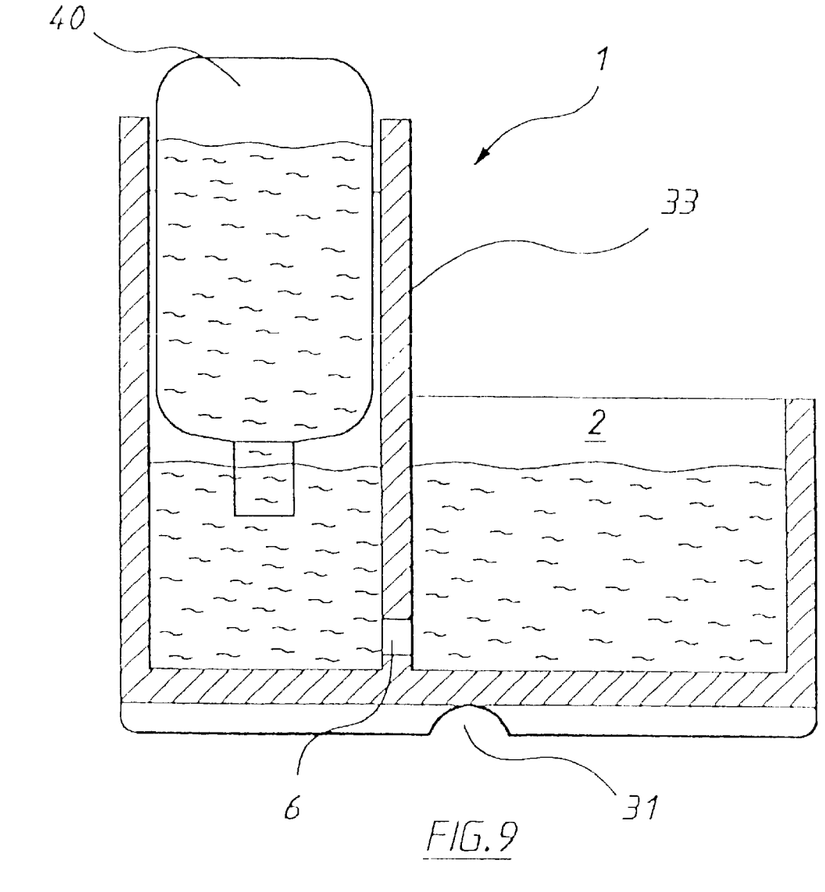
FIG. 9 depicts a sectional elevation view of a third preferred embodiment of the invention.

In a further alternative embodiment of the invention depicted in FIG. 9, the supply of drinking water for the bowl may be provided from a reservoir, such as a bottle or the like. Referring to FIG. 9, the drinking water is contained in an inverted bottle 40 which supplies water to the bowl under a vacuum. It is envisaged that this embodiment would be particularly useful for indoor applications where it is impractical or undesirable to have the bowl connected to a main water supply.

Although the invention has been described with reference to specific examples it will be appreciated by those skilled in the art that the invention may be embodied in many other forms.

What is claimed is:

1. A pet animal drinking bowl, said bowl including a first surface at least partially defining a depression for holding drinking water and a second surface exposed to air, said first and second surfaces being separated by a water permeable material so that water may pass through said first surface to said second surface, wherein evaporation of water from said second surface acts to cool the drinking water contained within said depression, said bowl further including a chamber for receiving water from a source, wherein there is provided fluid communication between said chamber and said depression so as to permit a flow of water from said chamber to said depression so as to maintain a predetermined level of water within said depression.

2. The pet animal drinking bowl as defined in claim 1, wherein the second surface includes a number of spaced apart support columns which define a plurality of air flow channels.

3. The pet animal drinking bowl as defined in claim 1, wherein the water permeable material is an unsintered ceramic material.

4. The pet animal drinking bowl as defined in claim 1, wherein the water permeable material is stoneware or earthenware.

5. The pet animal drinking bowl as defined in claim 1, wherein said bowl is adapted to be connected to a main water supply such that said chamber receives water from said main water supply, said bowl further including a valve to regulate the supply of water to the chamber.

6. The pet animal drinking bowl as defined in claim 5, wherein a float is located in said chamber and is operatively connected to said valve in order to maintain said predetermined level of water within said depression.

7. The pet animal drinking bowl as defined in claim 6, wherein the float is connected to one end of an arm, an opposing end of the arm being operatively connected to said valve such that rotation of the arm causes opening and closing of the valve to regulate the supply of water to the chamber.

8. The pet animal drinking bowl as defined in claim 1, wherein the fluid communication between the chamber and the depression is provided by means of a port extending through a wall separating said chamber and said depression.

9. The pet animal drinking bowl as defined in claim 1, wherein the source of water for the bowl is provided from a bottle which supplies water to the chamber under vacuum.

* * * * *